United States Patent

Häussling et al.

[11] Patent Number: 5,981,677
[45] Date of Patent: Nov. 9, 1999

[54] RADIATION-CURABLE COMPOSITION COMPRISING α-OLEFINS

[75] Inventors: Lukas Häussling, Bad Dürkheim; Ludwig Bernhard, Heppenheim; Wolfgang Reich, Maxdorf; Reinhold Schwalm, Wachenheim; Erich Beck, Ladenburg; Gabriele Hartmann, Hockenheim, all of Germany

[73] Assignee: BASF Aktiengesellschaft, Ludwigshafen, Germany

[21] Appl. No.: 08/754,005

[22] Filed: Nov. 20, 1996

[51] Int. Cl.⁶ ..................................................... C08F 22/10
[52] U.S. Cl. ........................... 526/321; 526/324; 526/329; 526/329.1; 526/348.3
[58] Field of Search .................... 526/321, 324, 526/329, 329.1, 348.3

[56] References Cited

U.S. PATENT DOCUMENTS

| 3,265,677 | 8/1966 | Delacretaz et al. ....................... 526/321 |
| 3,305,507 | 2/1967 | White et al. .......................... 526/348.3 |
| 3,876,722 | 4/1975 | Rossi et al. .......................... 526/348.3 |
| 3,951,935 | 4/1976 | Engelmann ............................... 526/210 |
| 4,940,846 | 7/1990 | Hinterwaidner . |
| 5,112,882 | 5/1992 | Babu et al. . |
| 5,202,361 | 4/1993 | Zimmerman et al. . |
| 5,254,649 | 10/1993 | Milu et al. ............................... 526/210 |
| 5,559,164 | 9/1996 | Babu et al. . |

FOREIGN PATENT DOCUMENTS

| 33 29 877 | 3/1985 | Germany . |
| 55-154911 | 12/1980 | Japan ..................................... 526/324 |

OTHER PUBLICATIONS

Patent Abstracts of Japan, vol. 9, No. 145 (C–287), Jun. 20, 1985 & JP 60 027628 A (Showa Denko KK), Feb. 12, 1985 *Zusammenfassung*.

*Primary Examiner*—Bernard Lipman
*Assistant Examiner*—N. Sarofim
*Attorney, Agent, or Firm*—Oblon, Spivak, McClelland, Maier & Neustadt, P.C.

[57] ABSTRACT

Radiation-curable compositions based on radiation-curable, free-radically polymerizable compounds comprise α-olefins having more than 8 carbon atoms.

16 Claims, No Drawings

RADIATION-CURABLE COMPOSITION COMPRISING α-OLEFINS

The present invention relates to radiation-curable compositions based on radiation-curable, free-radically polymerizable compounds, comprising α-olefins having more than 8 carbon atoms.

This invention also relates to a process for preparing moldings or coatings obtainable by such a process.

In the radiative curing of free-radically polymerizable compounds, for example (meth)acrylate compounds, the polymerization or curing reaction can be strongly inhibited by oxygen, especially at the surface. This inhibition leads to incomplete curing in the surface and thus for example to tacky coatings. In many cases, therefore, it is necessary to exclude atmospheric oxygen in order that the disadvantages associated with inhibition may be avoided.

DE-A-19 56 376 discloses reducing the oxygen inhibition during radiative curing by applying paraffins, waxes or polyolefins to the paint film to be cured. DE-A-33 29 877 describes low molecular weight olefins and polyolefins for the same purpose.

Existing methods of reducing oxygen inhibition do not show an adequate effect. More particularly, the disadvantages include matt surfaces being obtained on radiative curing.

It is an object of the present invention to provide radiation-curable compositions based on free-radically polymerizable compounds whose polymerization or curing is inhibited by oxygen to a significantly reduced extent, if at all, and which have a bright surface following the radiative curing.

We have found that this object is achieved by the radiation-curable compositions defined at the beginning.

The radiation-curable, free-radically polymerizable compounds are in particular free-radically polymerizable compounds having at least 2 copolymerizable, ethylenically unsaturated groups compounds a). Preferably at least 50% by weight, particularly preferably at least 80% by weight, of the radiation-curable, free-radically polymerizable compounds a).

Preferred compounds a) contain from 2 to 20, preferably 2 to 10, most preferably from 2 to 6, copolymerizable, ethylenically unsaturated double bonds.

More particularly, compounds a) are (meth)acrylate compounds, preferably acrylate compounds, ie. derivatives of acrylic acid.

The number average molecular weight $M_n$ of the compounds a), especially of the (meth)acrylate compounds, is preferably below 15000, particularly preferably below 5000, most preferably below 3000, g/mol and above 180 g/mol (determined by gel permeation chromatography using polystyrene as standard and tetrahydrofuran as eluant).

Useful (meth)acrylate compounds include (meth)acrylic esters and especially acrylic esters of polyfunctional alcohols, especially those which, as well as the hydroxyl groups, contain no further functional groups or, at most, ether groups. Examples of such alcohols include bifunctional alcohols, such as ethylene glycol, propylene glycol, and their higher condensed representatives, for example such as diethylene glycol, triethylene glycol, dipropylene glycol, tripropylene glycol, etc., butanediol, pentanediol, hexanediol, neopentylglycol, alkoxylated phenolic compounds, such as ethoxylated or propoxylated bisphenols, cyclohexanedimethanol, trifunctional and more highly functional alcohols, such as glycerol, trimethylolpropane, butanetriol, trimethylolethane, pentaerythritol, ditrimethylolpropane, dipentaerythritol, sorbitol, mannitol and the corresponding alkoxylated, especially ethoxylated and propoxylated, alcohols.

The alkoxylation products are obtainable in a known manner by reacting the aforementioned alcohols with alkylene oxides, especially ethylene oxide or propylene oxide. Preferably the degree of alkoxylation per hydroxyl group is from 0 to 10, ie. 1 mol of hydroxyl group can preferably be alkoxylated with up to 10 mol of alkylene oxides.

Useful (meth)acrylate compounds further include polyester(meth)acrylates, the acrylic esters of polyesterols.

Useful polyesterols include for example those as can be prepared by esterification of polycarboxylic acids, preferably dicarboxylic acids, with polyols, preferably diols. The starting materials for such hydroxyl-containing polyesters are known to the person skilled in the art. Preferred dicarboxylic acids are succinic acid, glutaric acid, adipic acid, sebacic acid, o-phthalic acid, their isomers and hydrogenation products and also esterifiable derivatives, such as anhydrides or dialkyl esters of the acids mentioned. Useful polyols include the abovementioned alcohols, preferably ethylene glycol, 1,2-propylene glycol, 1,3-propylene glycol, 1,4-butanediol, 1,6-hexanediol, neopentylglycol, cyclohexanedimethanol and also polyglycols of the ethylene glycol and propylene glycol type.

Polyester(meth)acrylates can be prepared in multiple stages or else in a single stage, for example as described in EP 279 303, from acrylic acid, polycarboxylic acid and polyol.

Further useful compounds a) include for example epoxy or urethane(meth)acrylates.

Epoxy(meth)acrylates are for example those which are obtainable by reacting epoxidized olefins or poly- or diglycidyl ethers, such as bisphenol A diglycidyl ether, with (meth)acrylic acid.

The reaction is known to the person skilled in the art and described for example in R. Holmann, U. V. and E. B. Curing Formulation for Printing Inks and Paints, London 1984.

Urethane(meth)acrylates are in particular reaction products of hydroxyalkyl(meth)acrylates with poly- or diisocyanates (see likewise R. Holmann, U. V. and E. B. Curing Formulation for Printing Inks and Paints, London 1984).

It is of course also possible to use mixtures of different compounds a), including in particular mixtures of the above (meth)acryloyl compounds.

Useful compounds a) also include for example unsaturated polyester resins consisting essentially of polyols, especially diols, and polycarboxylic acids, especially dicarboxylic acids, one of these esterification components containing a copolymerizable, ethylenically unsaturated group. Examples are maleic acid, fumaric acid and maleic anhydride.

Useful radiation-curable, free-radically polymerizable compounds also include compounds having only one ethylenically unsaturated, copolymerizable group (compounds b).

Examples include $C_1$–$C_{20}$-alkyl(meth)acrylates, aromatic vinyl compounds having up to 20 carbon atoms, vinyl esters of carboxylic acids containing up to 20 carbon atoms, ethylenically unsaturated nitriles, vinyl ethers of alcohols containing from 1 to 10 carbon atoms, and aliphatic hydrocarbons having from 2 to 8 carbon atoms and 1 or 2 double bonds.

Preferred alky(meth)acrylates are those having a $C_1$–$C_{10}$-alkyl radical, such as methyl methacrylate, methyl acrylate, n-butyl acrylate, ethyl acrylate and 2-ethylhexyl acrylate.

More particularly, mixtures of alkyl(meth)acrylates are also suitable.

Examples of vinyl esters of carboxylic acids having from 1 to 20 carbon atoms include vinyl laurate, vinyl stearate, vinyl propionate and vinyl acetate.

Examples of suitable aromatic vinyl compounds include vinyltoluene, α-butylstyrene, 4-n-butylstyrene, 4-n-decylstyrene and preferably styrene.

Examples of nitriles are acrylonitrile and methacrylonitrile.

Examples of suitable vinyl ethers include vinyl methyl ether, vinyl isobutyl ether, vinyl hexyl ether and vinyl octyl ether.

Examples of suitable nonaromatic hydrocarbons having from 2 to 8 carbon atoms and one or two olefinic double bonds include butadiene, isoprene, and also ethylene, propylene and isobutylene.

Compounds b) are preferably used together with compounds a), acting especially as reactive diluents when used in amounts of from 0 to 50% by weight, preferably from 0 to 20% by weight, based on the total amount of radiation-curable, free-radically polymerizable compound.

According to the invention, the radiation-curable composition comprises α-olefins having more than 8 carbon atoms. (These α-olefins are included among the radiation-curable, free-radically polymerizable compounds in all specifications of weights and quantities.)

The α-olefin content is preferably from 0,001 to 10% by weight, particularly preferably from 0.01 to 5% by weight, based on the total amount of radiation-curable, free-radically polymerizable compound.

α-Olefins have a carbon-carbon double bond between the 1st and 2nd carbon atom of carbon chain. Preferably they are monoolefins, ie. preferably they contain no further double bonds.

The α-olefins preferably contain more than 20, particularly preferably more than 24, most preferably more than 26, carbon atoms. Very good results are obtained with α-olefins having 28 carbon atoms, especially 30 carbon atoms or more.

Very long-chain α-olefins are suitable for the radiation-curable compositions. In general, α-olefins having up to 100, preferably up to 60, carbon atoms are sufficient.

Suitable α-olefins include in particular: octacosa-1-ene, triaconta-1-ene, dotriaconta-1-ene, tetratriaconta-1-ene, hexatriaconta-1-ene, octatriaconta-1-ene.

The radiation-curable compositions can be prepared by mixing the α-olefins with the other ingredients in any desired order.

More particularly, the α-olefins are first added to the other radiation-curable compounds and then mixed in, for example by stirring, while the temperature is raised to, for example, 80° C. The mixture obtained is then filtered after cooling.

The compositions of this invention may include further additives. Possibilities are in particular hydrophobic assistants, for example petroleum ethers or higher boiling alkanes or paraffins, which can enhance the oxygen inhibition control effect of the α-olefins.

The composition of this invention may additionally include additives which are customary for the intended application.

For coating applications these additives can be for example pigments, dyes, fillers and so on.

The radiation-curable compositions can be free-radically cured by UV light or electron beam curing.

For UV light curing, it is customary to add photoinitiators in amounts of up to 5% by weight, based on the radiation-curable, free-radical polymerizable compounds.

Examples of suitable photoinitiators include benzophenone, alkylbenzophenones, halomethylated benzophenones, Michler's ketone, anthrone and halogenated benzophenones. Also suitable are benzoin and its derivatives. Similarly active photoinitiators are anthraquinone and a large number of its derivatives, for example β-methylanthraquinone, tert-butylanthraquinone and anthraquinonecarboxylic esters and, particularly effectively, acylphosphine oxides, for example 2,4,6-trimethylbenzoyl-diphenylphosphine oxide (Lucirin® TPO).

The compositions of this invention may additionally include solvents, for example for adjusting the processing viscosity.

Examples of suitable solvents include dimethylformamide, N-methylpyrrolidone, butyl acetate, methylpropylene glycol acetate and diethylene glycol dimethyl ether.

The compositions of this invention cure to form tack-free coatings or moldings which have good mechanical properties, for example high hardness and good elastic properties, and a bright surface.

There is virtually no sign of oxygen inhibition, so that oxygen-excluding measures, for example protective gases or film covers, can be wholly or partly dispensed with.

EXAMPLES

1. Observation of the Polymerization Rate by IR Real-time Spectroscopy

In the method described by Prof. Decker in J. Polym. Sci.: Part A: Polymer Chemistry 30 (1992), 913, a coating on a sodium chloride pellet is cured with UV light in an IR infrared spectrometer while the decrease in the number of double bonds, ie. the conversion of the double bonds, is observed as a function of time by means of infrared spectroscopy.

The conversion achieved for the various samples following 3 seconds of irradiation under air is reported below. The samples included 4% by weight of Irgacure 500 as photoinitiator. Laromer LR®8863 is a polyether acrylate.

| Sample | Conversion |
| --- | --- |
| Laromer 8863 | 15% |
| Laromer 8863 with 0.1% by weight of $C_{24-28}$-α-olefin | 30% |
| Laromer 8863 with 0.1% by weight of $C_{30}$-α-olefin | 70% |
| Laromer 8863 covered with a film | 70% |

2. Application

To the commercially available polyether acrylate Laromer LR 8863 were added 4% by weight of Irgacure 500 photoinitiator and 0.1% of α-olefin C 30 Plus from Chevron (Gulftene®), the mixture was applied to a glass support by means of a box doctor, the glass support was placed on a conveyor belt and carried at a belt speed of 13 or 60 or 100 m/min past a UV lamp for curing. Paraffin and β-olefins were mixed with Laromer LR 8863 for comparison.

The appearance of the cured coating was rated and the pendulum hardness was determined in seconds (s) by the method of DIN 53 157.

| Addition to Laromer 8863 | Belt speed (m/min) | Pendulum hardness (s) | Mar resistance[3] | Appearance[4] |
|---|---|---|---|---|
| 0.1% of C$_{30}$-α-olefin | 13 | 120 | + | + |
|  | 60 | 121 | + | + |
| 1% of paraffin 1 | 13 | 140 | + | + |
|  | 60 | 49 | − | − |
| 0.1% of C$_{30}$-α-olefin + 1% of paraffin | 13 | 154 | + | + |
|  | 100 | 92 | + | +− |
| 1% of Glissopal[2] | 13 | 104 | +− | − |
|  | 60 | 91 | − | − |
| 0.1% of C$_{30}$-α-olefin + 5% of petroleum ether | 13 | 154 | + | + |
|  | 100 | 95 | + | + |
| 0.1% of C$_{30}$-alkanol | 60 | 50 | − | +− |

[1] Paraffin with melting range from 56 to 58° C.
[2] Polyisobutylene (β-olefin)
[3] Mar resistant: +; non-mar resistant: −
[4] Smooth surface: +; cratering/orange peel effect: −

We claim:

1. A radiation-curable composition comprising (1) at least one radiation-curable, free-radically polymerizable compound, wherein at least one of said compound is a (meth)acrylate compound, and (2) about 0.001 to about 10% by weight of an α-olefin having more than eight carbon atoms.

2. Radiation-curable composition as claimed in claim 1, wherein the α-olefin has more than 24 carbon atoms.

3. Radiation-curable composition as claimed in claim 1, comprising from 0.1 to 10% by weight of said α-olefin, based on the total amount of free-radically polymerizable compounds.

4. Radiation-curable composition as claimed in claim 1, wherein not less than 50% by weight of the radiation-curable, free-radically polymerizable compounds are (meth)acrylate compounds having two or more (meth)acryloyl groups.

5. A process for preparing radiation-curable compositions having reduced sensitivity to oxygen, which comprises adding α-olefins having more than 8 carbon atoms to the radiation-curable compositions.

6. A process for preparing coatings or moldings, which comprises irradiating radiation-curable compositions as claimed in claim 1 with high-energy light.

7. Moldings or coatings obtainable by the process of claim 6.

8. Radiation-curable composition as claimed in claim 1, wherein the α-olefin has more than 20 carbon atoms.

9. Radiation-curable composition as claimed in claim 1, wherein the α-olefin has more than 26 carbon atoms.

10. Radiation-curable composition as claimed in claim 1, wherein the α-olefin has at least 28 carbon atoms.

11. Radiation-curable composition as claimed in claim 1, wherein the α-olefin has at least 30 carbon atoms.

12. Radiation-curable composition as claimed in claim 1, wherein the radiation-curable, free-radically polymerizable compound is selected from the group consisting of (a) compounds having at least two copolymerizable, ethylenically unsaturated groups, (b) compounds having only one ethylenically unsaturated, copolymerizable group, and (c) mixtures thereof.

13. Radiation-curable compositions as claimed in claim 1, wherein the radiation-curable, free-radically polymerizable compound is a polyether acrylate.

14. Radiation-curable composition as claimed in claim 1, comprising from 0.01 to 5% by weight of said α-olefin, based on the total amount of free-radically polymerizable compounds.

15. A radiation-curable composition comprising (1) at least one radiation-curable, free-radically polymerizable compound, and (2) an effective amount for reducing inhibition by oxygen during polymerization or curing thereof, of an α-olefin having more than eight carbon atoms, wherein said composition, when cured, is not tacky.

16. The radiation-curable composition as claimed in claim 15, wherein at least one of component (1) is a (meth)acrylate compound.

* * * * *

UNITED STATES PATENT AND TRADEMARK OFFICE
CERTIFICATE OF CORRECTION

PATENT NO. : 5,981,677
DATED : November 9, 1999
INVENTOR(S) : Lukas HÄUSSLING, et al It is certified that error appears in the above-identified patent and that said Letters Patent is hereby corrected as shown below:

On the title page, item [30], Foreign Application Priority Data has been omitted. It should read as follows:

--[30]  Foreign Application Priority Data

Nov. 29, 1995  [DE]   Germany........................19544493

Signed and Sealed this

Twenty-third Day of January, 2001

Attest:

Q. TODD DICKINSON

*Attesting Officer*              *Commissioner of Patents and Trademarks*